(12) United States Patent
McFadyen

(10) Patent No.: US 7,591,064 B2
(45) Date of Patent: Sep. 22, 2009

(54) METHOD OF FABRICATION FOR TAPE MEDIUM READ HEAD WITH UNITARY FORMATION OF MULTIPLE ELEMENTS

(75) Inventor: Ian Robson McFadyen, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 382 days.

(21) Appl. No.: 11/186,138

(22) Filed: Jul. 20, 2005

(65) Prior Publication Data

US 2007/0017086 A1 Jan. 25, 2007

(51) Int. Cl.
*G11B 5/29* (2006.01)

(52) U.S. Cl. ............ 29/603.12; 29/603.16; 29/603.1; 29/854; 29/603.19; 360/314; 360/316; 360/322

(58) Field of Classification Search .......... 29/603.07, 29/603.12, 603.13, 603.14, 603.15, 603.16, 29/603.18, 603.1, 831, 854, 603.19; 360/313, 360/314, 322, 327.1, 316

See application file for complete search history.

(56) References Cited

U.S. PATENT DOCUMENTS

| | | | | |
|---|---|---|---|---|
| 4,771,349 A | * | 9/1988 | Tsang | 360/327.1 |
| 4,802,043 A | * | 1/1989 | Sato et al. | 360/316 |
| 4,814,918 A | * | 3/1989 | Somers | 360/316 |
| 5,742,995 A | * | 4/1998 | Amin et al. | 29/603.1 |
| 5,784,772 A | * | 7/1998 | Ewasko et al. | 29/603.15 |
| 6,344,951 B1 | * | 2/2002 | Sato et al. | 360/316 |
| 6,493,926 B2 | * | 12/2002 | Han et al. | 29/603.14 |
| 6,739,948 B2 | | 5/2004 | Biskeborn | |
| 6,760,177 B2 | | 7/2004 | Biskeborn | |

FOREIGN PATENT DOCUMENTS

JP 2001-84522 * 3/2001

OTHER PUBLICATIONS

Ohanian, H. C., "Physics", W. W. Norton & Company, Inc., 1985, First Edition, pp. 649-654.*

* cited by examiner

*Primary Examiner*—A. Dexter Tugbang
(74) *Attorney, Agent, or Firm*—Patent Law Office of Larry Guernsey; Larry B. Guernsey

(57) ABSTRACT

A method is presented for fabrication of a tape medium read head having a unitary formation of multiple elements for reading multi-track data from a magnetic tape. The method includes providing a continuous substrate layer, and forming a sensor material layer on the continuous substrate layer. Photoresist material is deposited on the sensor material layer, and is patterned to form masks which provide protected areas and exposed areas of the sensor material layer. Exposed areas of the sensor material layer are shaped to form sensors from the protected areas of the sensor material layer. Electrical lead materials are deposited between and adjacent to the sensors, and the masks are removed.

5 Claims, 6 Drawing Sheets

METHOD OF FABRICATION FOR TAPE MEDIUM READ HEAD WITH UNITARY FORMATION OF MULTIPLE ELEMENTS

BACKGROUND OF THE INVENTION

1. Field of the Invention

The present invention relates generally to read and write heads for magnetic tape recorders and particularly to recorders of high density information on magnetic tape

2. Description of the Prior Art

Although magnetically recorded disks have largely surpassed magnetic tape as the preferred storage media for computers, magnetic tape is still used and is subject to the same quest for improved storage capacity that motivates the entire computer industry.

Magnetic tape drives operate by passing magnetic tape across a tape recording head which includes a plurality of tape writing elements and tape reading elements. A typical tape drive includes an actuator means for moving the tape head laterally relative to the longitudinal axis of the tape, such that the tape head reading and writing elements may access different data tracks on the magnetic tape, and a typical magnetic tape may have many data tracks written on it. A typical magnetic tape also includes a plurality of servo tracks that are written onto the tape during manufacturing, and which are used by the tape drive for tape head alignment and control purposes.

As the demand for increased storage goes on, the number of tracks recorded on a width of tape has increased from 8 to 16 to 32 and beyond. As the width of the tape used is fairly standardized, the reading and recording elements must become smaller and closer together in order to increase the number of tracks. This makes precise alignment increasingly crucial to prevent read/write errors. The tape medium additionally experiences a difficulty not experienced by disk media, namely that it stretches. With the increasing density of data storage upon the tape, the chances for read/write errors as stretched tape misaligns with the read heads are thus increased.

Increased storage density and precise alignment of heads involve several parameters that are crucial. Traditional tape read heads are composed of a number of discrete elements that are configured with a pair of electrical leads for each track, as shown in FIG. 1 (prior art). For the sake of this discussion, the read head 1 will be considered to be composed of a number of elements 2, of which each element 2 includes a sensor 4 between two electrical leads 3. There are thus a total of four elements shown for example in the read head 1 of FIG. 1. The track width 5 is shown as width of the sensor 4, which corresponds also to the distance between each of the two electrical leads 3. The element pitch 6 is defined as the distance measured from the center line 7 of each track 8. In the traditional design, the discrete elements 2 are separated by a spacing gap 9, which contributes to the width of the element pitch 6.

This traditional design has several disadvantages. As dimensions of the elements 2 become smaller, the resistance of the leads 3 relative to the resistance of the elements 2 becomes higher, and the likelihood of element-to-element shorting becomes higher. Also, as referred to above, stretch by the tape can be a problem, and it is a problem with complexities. In a tape having wider tracks which are spread out across the width of the tape, when there is a side-to-side stretch of the tape, it can be assumed that the stretch will be approximately proportional across it length, so that each track will be displaced a proportionate amount and thus misaligned from the tape read head by this proportionate amount. In newer designs of tape read heads however, there are more tracks closer together. When this tape is stretched, each track is displaced by a smaller distance and consequently, the tracks are less misaligned than in the previous style where the tracks are more spread out Thus there is a need for a read head in which the sensor elements are not individual and discrete, in which spacing gaps between elements are not required, and which can be fabricated in very small dimensions without creating relatively high resistance in the electrical leads.

SUMMARY OF THE INVENTION

A preferred embodiment of the present invention is a method of fabrication of a tape medium read head having a unitary formation of multiple elements for reading multitrack data from a magnetic tape. The method includes providing a continuous substrate layer, and forming a sensor material layer on the continuous substrate layer. Photoresist material is deposited on the sensor material layer, and is patterned to form masks which provide protected areas and exposed areas of the sensor material layer. Exposed areas of the sensor material layer are shaped to form sensors from the protected areas of the sensor material layer. Electrical lead materials are deposited between the sensors, and the masks are removed.

It is an advantage of the present invention that multiple elements are combined into a single multi-tap head.

It is another advantage of the present invention that fabrication can be performed more easily at smaller and smaller dimensions.

It is a further advantage of the present invention that less stringent processing is required during fabrication.

It is yet another advantage of the present invention that electrical leads with lower resistance are allowed and that issues of element-to-element shorting are eliminated.

It is an additional advantage of the present invention that data tracks may be reduced in size and positioned close together, so that stretching of the tape produces fewer errors.

It is an advantage of the present invention that tracks widths and locations can be established by a unified matrix of elements rather than by an assemblage of individual elements where the center-to-center spacing may be harder to control precisely.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

The present invention is a tape head having unitary formation of multiple elements, which will be designated by the element number 10. The inventive features of the present invention may be best appreciated by a comparison with discrete element tape heads of the prior art as shown in FIG. 1.

Figure 1:
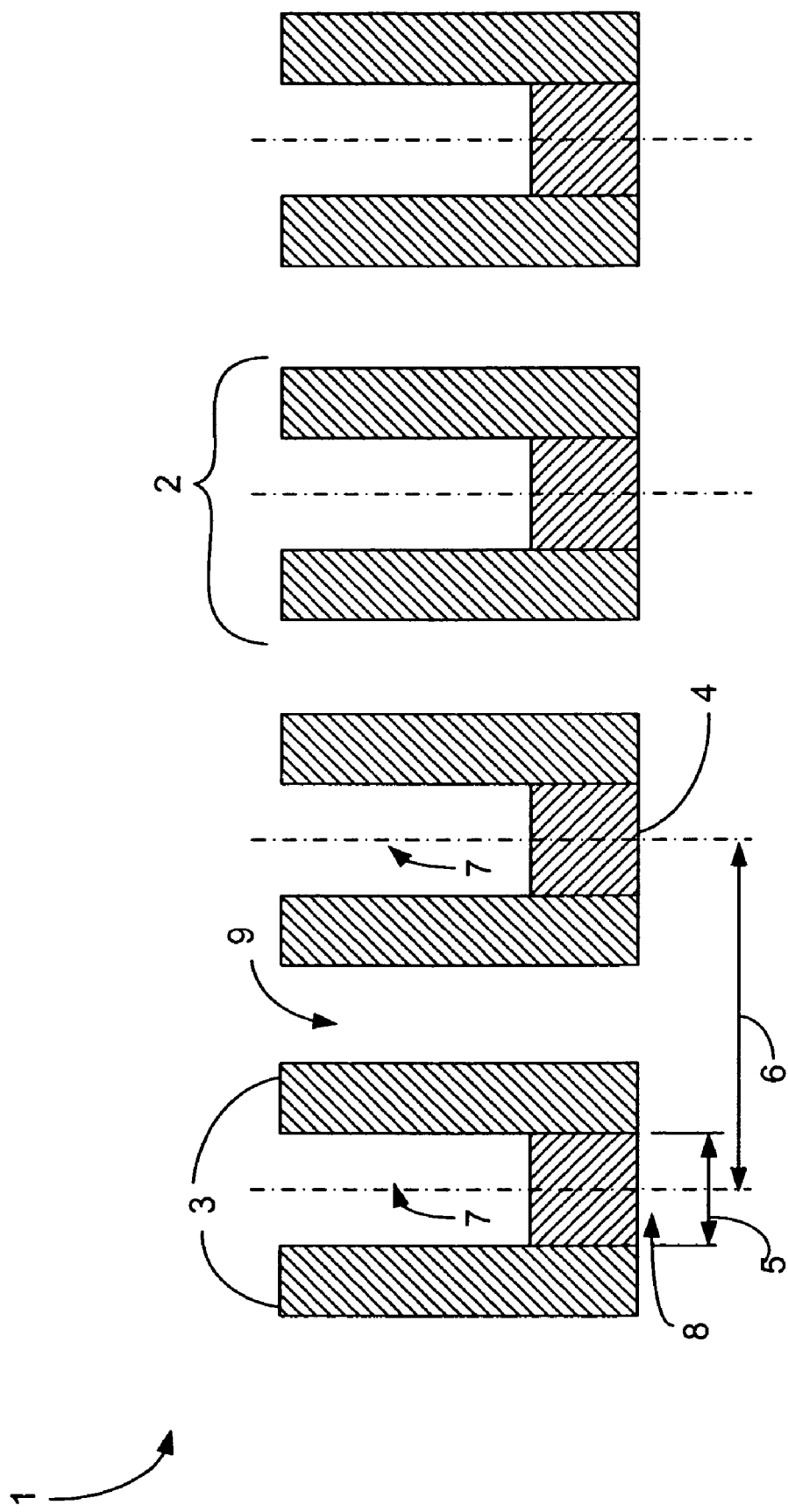
FIG. 1 is a top plan view of a read head of the prior art.

Traditional tape heads are composed of a number of discrete elements that are configured with a pair of leads and a sensor for each track, as shown in FIG. 1 (prior art). For the sake of this discussion, the tape read head 1 will be considered to be composed of a number of elements 2, of which each element 2 includes a sensor 4 and two leads 3. There are thus a total of four elements shown for example in the read head 1 of FIG. 1 which make up the head 1. The track width 5 is shown as the width of the sensor 4, which also corresponds to the distance between each of the two electrical leads 3. The element pitch 6 is defined as the distance measured from the center line 7 of each track 8. In the traditional design, the discrete elements 2 are separated by a spacing gap 9, which contributes to the width of the element pitch 6.

Figure 2:
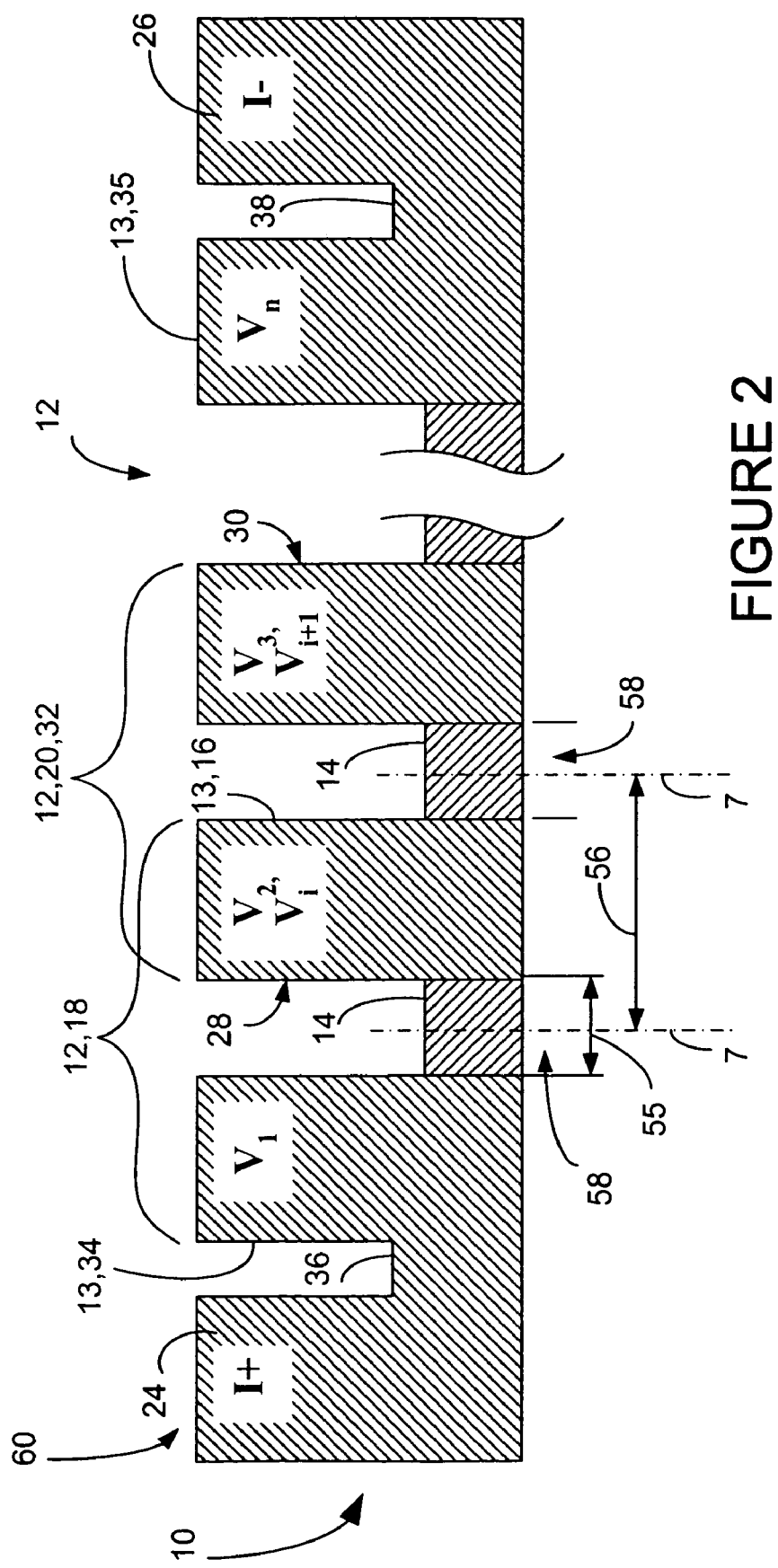
FIG. 2 is a top plan view of a read head of the present invention.
Figure 3:
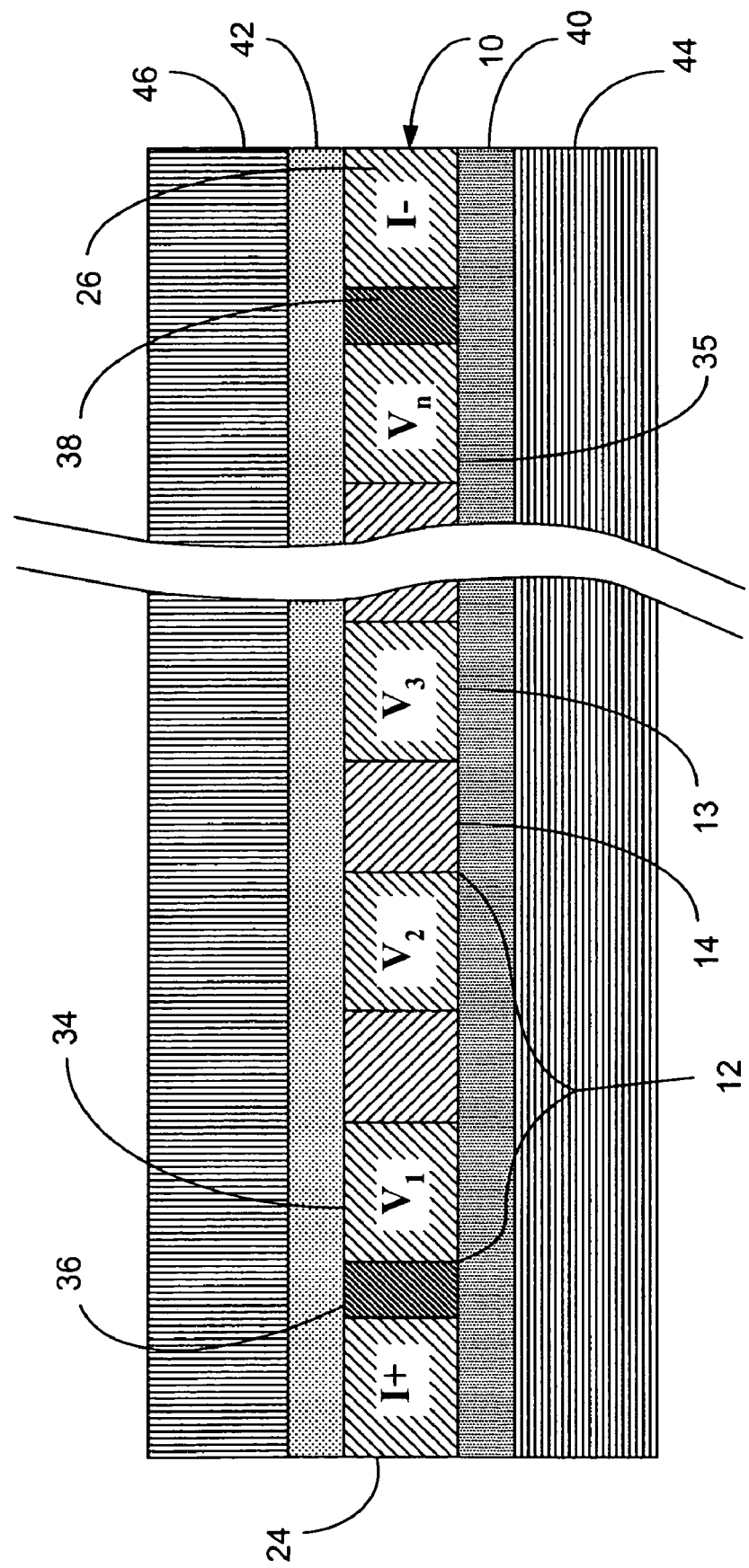
FIG. 3 is a cross-sectional view of a read head of the present invention.

The present invention has a number of elements which have been fabricated as a unitary structure. The term unitary structure shall be used for purposes of this discussion to mean that the elements are formed together as one electrically connected structure, rather than fabricated as electrically separate elements, as is practiced in the prior art. The present tape head having a unitary structure of elements, will be referred to as a unitary read head 10, and is shown in FIGS. 2 and 3. The unitary read head 10 is again considered to be composed of a number of elements 12 which have been fabricated together to form an element matrix 60.

These elements 12 each include a sensor 14, and two electrical leads 13. It will be noted that an electrical lead 13, such as example lead 16 can be a member of both a first element 18 and a second element 20, as shown. The unitary read head 10 includes a constant current source 22 (see FIG. 4), which is connected between the positive terminal I+ 24 and the negative terminal I− 26. The voltages on the various leads 13 are designated as $V_1$-$V_N$, and the figure is shown as being abbreviated after V3 to indicate that the number of leads 13 and thus of elements 12 is not limited to the number shown, and may extend to number 32 elements or more. Voltage measurements are taken between any particular lead, designated as Vi 28 and the next lead to it, designated as Vi+1 30. This method provides isolated resistance measurements for the "ith" element 32. For example, the track between V2 and V3 is shown as being this "ith" element 32, thus V2 becomes lead Vi 28 and V3 becomes Vi+1 30 for purposes of this example. Between I+ 24 and the $1^{st}$ voltage lead 34, designated V1, there may be a first bridge portion 36, and between I− 26 and the last voltage lead 35, designated Vn, there may be a second bridge portion 38.

FIG. 2 also includes track width 55 is shown as the width of the sensor 14 and thus the distance between each of the two leads 13. The element pitch 56 is the distance as measured from the center line 7 of each track 58. It can be seen in comparing the relative widths of the element pitch of the present invention 56 and the prior art 6 that the element pitch 56 of the present invention is narrower, as allowed by the grouping of the elements onto a single matrix 60. By electrically connecting the elements together, they can be fabricated with a closer spacing, or pitch 56, than that allowed when elements are fabricated so as to be electrically isolated.

FIG. 3 shows a top plan view of the unitary read head 10 in the larger context. Leads I+ 24 and I− 26 for connection of a current source 22 (see FIG. 4) are shown, as well as leads 13 including $V_1$-$V_n$. This unitary read head 10 is sandwiched between a first gap layer G1 40 and a second gap layer G2 42. These in turn are sandwiched between a first shield layer S1 44 and a second shield layer S2 46. Again, the figure is shown as being abbreviated after V3 to indicate that the number of electrical leads 13, and sensors 14 and thus of elements 12 is not limited to the number shown, and may extend to number 32 elements or more. A first bridge portion 36 and a second bridge portion 38 are also again shown.

Figure 4:
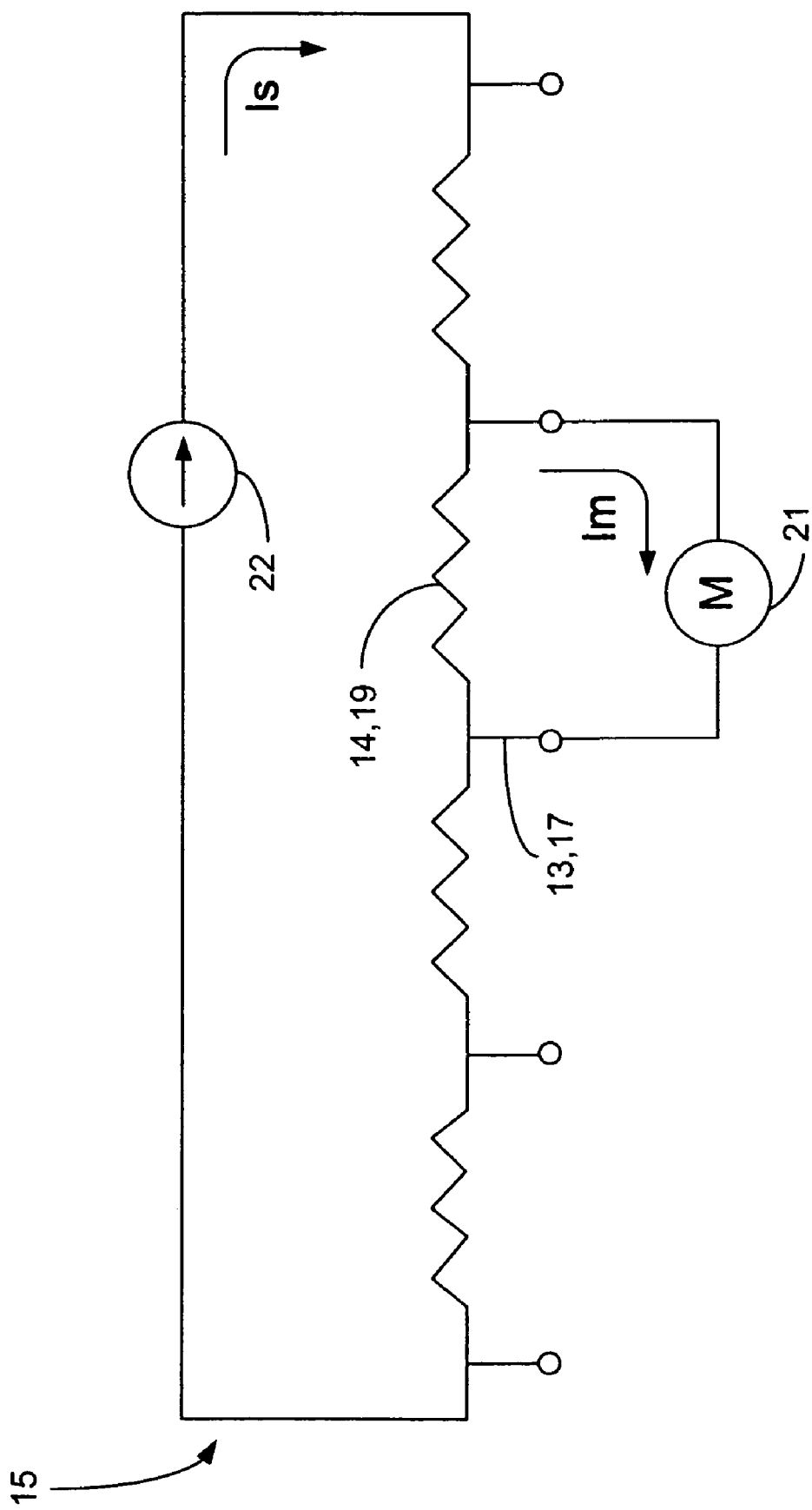
FIG. 4 is a circuit diagram of a measurement circuit used to read data by the read head of the present invention.

FIG. 4 shows a circuit diagram of a measurement circuit 15 used to read data detected by the sensors 14. Source current $I_s$ is provided by the current source 22. Leads 13 are modeled as the taps 17 on either side of the sensors 14, modeled in the diagram as resistors 19. Data is read by the various sensors 14 as they pass over the tape as a changing voltage which is read by a measurement current $I_m$ in a series of detectors 21, (of which only one is shown) each of which is connected in parallel with the sensor 14. The detected change in current is then interpreted as data bits by the central processor (not shown).

Figure 6:
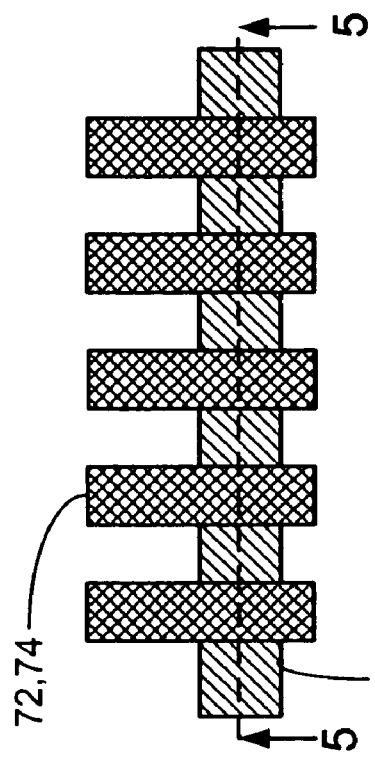
FIG. 6 is a top plan view of a first stage in the fabrication.
Figure 5:
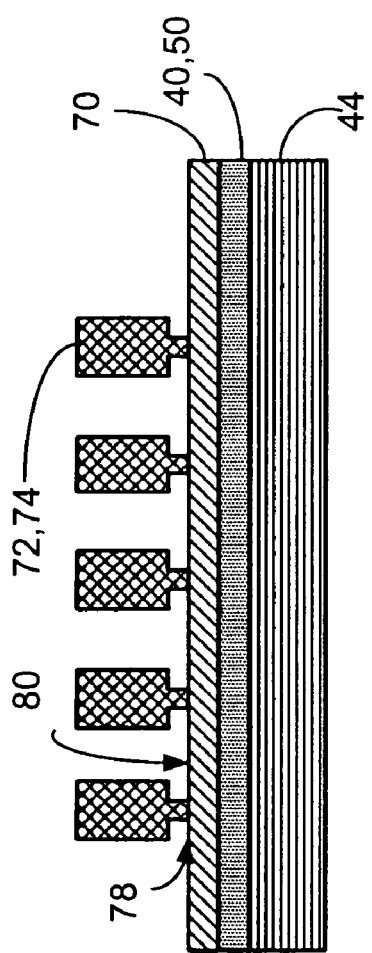
FIG. 5 is a cross-sectional view of a first stage in the fabrication process, as taken through line 5-5 in FIG. 6.

FIGS. 5-12 show stages in the fabrication of the unitary read head 10. It will be noted that the figures are presented in pairs, with the first being a cross-sectional view of the second, so that, for example, FIG. 6 is a top plan view of a first stage in the fabrication process, and FIG. 5 is a cross-sectional view as taken through line 5-5 in FIG. 6. The figures will therefore be discussed in pairs.

FIGS. 5 and 6 show a first shield layer S1 44, upon which a first insulation layer G1 40 has been fabricated. The MR sensor material layer 70, from which the sensors will be formed, is deposited on the insulation layer 40. This MR sensor material layer 70 is made of a number of layers, but are shown here as one layer for simplicity. The MR sensor material layer 70 is formed on a continuous substrate layer 50, which provides unitary positioning and location for the finished sensors and elements, to be discussed below. In this case, the continuous substrate layer 50 is the first gap layer 40.

Photoresist material 72 is deposited on the sensor material layer 70 and has been patterned into masks 74. As is well known in the art, these masks 74 shield protected portions 78 of the sensor material layer 70 and leave exposed portions 80 to be shaped by fabrication processes. In the top plan view of FIG. 6, only the masks 74 and exposed portions 80 of the sensor material layer 70 are visible.

Figure 8:
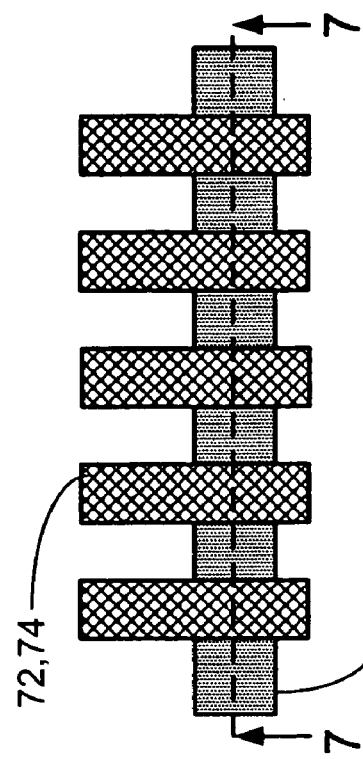
FIG. 8 is a top plan view of the next stage in the fabrication.
Figure 7:
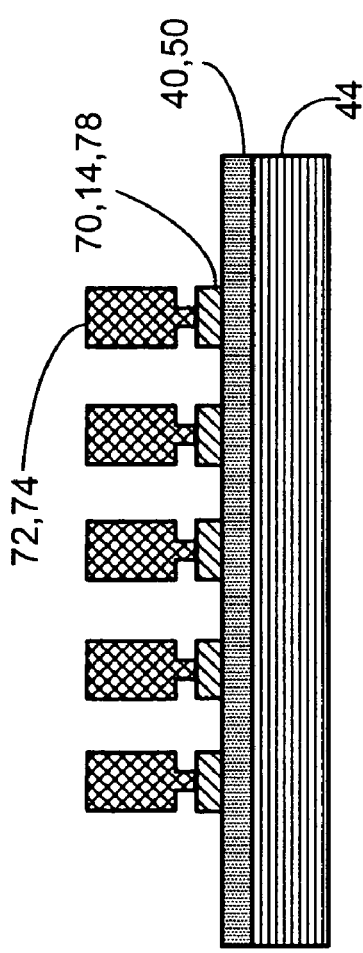
FIG. 7 is a cross-sectional view of the next stage in the fabrication process, as taken through line 7-7 in FIG. 8.

FIGS. 7 and 8 show the effect of ion milling to pattern the sensor material 70 to form the MR sensors 14 of the read head. It will be understood that although only five sensors are shown in the figure for simplicity, the number in practice will likely be a power of two, such as 32 or 64, etc., although this is not to be considered a limitation. In the top plan view of FIG. 8, only the masks 74 and insulation material 40 is now visible.

Figure 10:
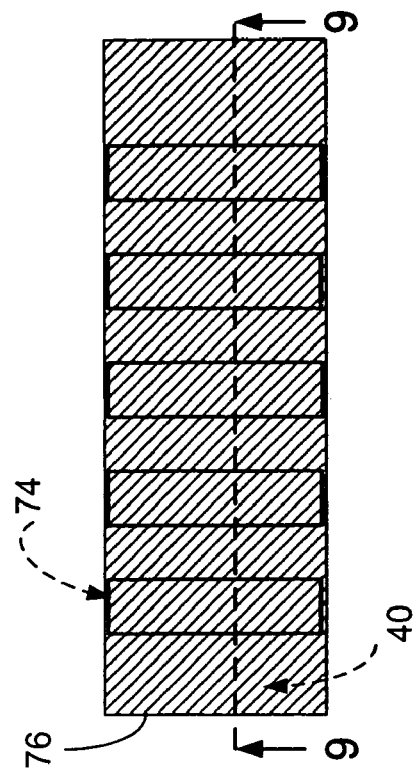
FIG. 10 is a top plan view of the following stage in the fabrication.
Figure 9:
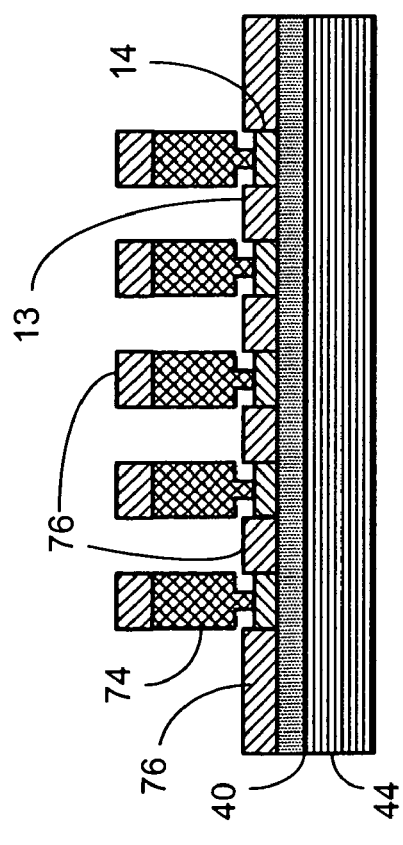
FIG. 9 is a cross-sectional view of the following stage in the fabrication process, as taken through line 9-9 in FIG. 10.

FIGS. 9 and 10 show the deposition of the hard bias and lead material 76, from which the electrical leads 13 will be formed (see FIG. 2). The lead material 76 covers the insulation material 40 and the masks 74. The top plan view of FIG. 10 shows only hard bias/lead material 76 covering all. This material serves the dual purpose of providing electrical connection to the elements and serving to provide a magnetic hard bias to the sensor material, thus the material is designated as hard bias/lead material 76.

Figure 12:
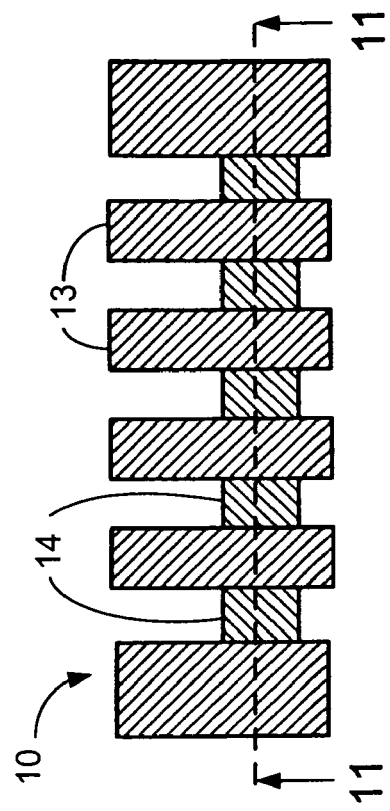
FIG. 12 is a top plan view of a next stage in the fabrication.
Figure 11:
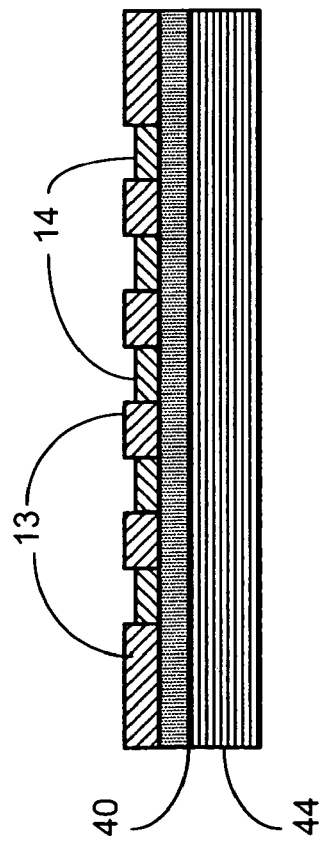
FIG. 11 is a cross-sectional view of a next stage in the fabrication process, as taken through line 11-11 in FIG. 12.

In FIGS. 11 and 12, the masks 74 and excess lead material 76 have been removed, leaving the sensor material 70 (see FIG. 7), now formed into sensors 14, exposed. The top plan view of FIG. 12 shows the alternating electrical leads 13 and sensors 14 which make up the unitary read head 10. At this point, the matrix of leads 13 has been established, with the electrical leads 13 interleaved with the MR sensors 14 to make the unitary read head 10.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A method for fabricating a read head having multiple integral elements for reading multiple tracks of recorded data on magnetic tape, comprising:
   A) providing a continuous substrate layer;
   B) forming multiple sensors on said substrate layer comprising:
      i) depositing photoresist material on said sensor material layer;
      ii) patterning said photoresist material to form masks which provide protected areas and exposed areas of said sensor material layer; and
      iii) shaping said exposed areas of said sensor material layer to form sensors from the said protected areas of said sensor material layer;
   C) fabricating electrical leads between said sensors, said sensors and electrical leads together forming elements in a matrix, and each electrical lead which is not the first lead in said matrix, or the last lead in said matrix, is simultaneously a member of a first element and a second element, such that a unitary read head is formed having said multiple sensors formed on said continuous substrate such that said multiple sensors are configured to read multiple tracks of recorded data on magnetic tape; and
   D) providing a means for connecting a current source having a positive terminal and a negative terminal.

2. The method of claim 1, wherein said forming of said sensors in B) is done by ion milling.

3. The method of claim 1, wherein said continuous substrate layer of A) is a first gap layer.

4. The method of claim 3, wherein said first gap layer is formed on a first shield layer.

5. The method of claim 1, wherein said electrical leads are formed from materials that also serve to magnetically bias said sensor material.

\* \* \* \* \*